(12) United States Patent
Fukuma et al.

(10) Patent No.: US 8,323,852 B2
(45) Date of Patent: Dec. 4, 2012

(54) EJECTOR AND FUEL CELL SYSTEM USING THE SAME

(75) Inventors: Kazunori Fukuma, Saitama (JP); Satoshi Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 351 days.

(21) Appl. No.: 12/705,146

(22) Filed: Feb. 12, 2010

(65) Prior Publication Data

US 2010/0209818 A1    Aug. 19, 2010

(30) Foreign Application Priority Data

Feb. 13, 2009   (JP) .................................. 2009-030674

(51) Int. Cl.
*H01M 8/04* (2006.01)
*F04F 5/00* (2006.01)

(52) U.S. Cl. ........................................ 429/513; 417/178
(58) Field of Classification Search .............. 417/52–55, 417/178, 187–189, 198
See application file for complete search history.

(56) References Cited

U.S. PATENT DOCUMENTS

| 7,438,535 | B2 | 10/2008 | Morishima |
| 2002/0106547 | A1 | 8/2002 | Sugawara et al. |
| 2002/0136942 | A1* | 9/2002 | Kashiwagi ..................... 429/34 |

FOREIGN PATENT DOCUMENTS

| CH | 125585 | 3/1927 |
| DE | 102004002021 A1 | 7/2004 |
| EP | 1722107 A1 | 11/2006 |
| JP | 2002-56688 | 2/2002 |
| JP | 2002-56868 | 2/2002 |
| JP | 2002-227799 | 8/2002 |
| JP | 2004-95528 | 3/2004 |
| JP | 2005-183357 | 7/2005 |

OTHER PUBLICATIONS

Machine translation of JP 2004-044411 A1.*
European Search Report for Application No. 10153418.8, dated Sep. 3, 2010.
Canadian Office Action for Application No. 2,693,017, dated Jan. 10, 2012.

* cited by examiner

*Primary Examiner* — Maria J Laios
(74) *Attorney, Agent, or Firm* — Nelson Mullins Riley & Scarborough LLP; Anthony A. Laurentano

(57) ABSTRACT

An ejector comprises a body, a nozzle, a needle, a diffuser which draws in a second fluid using negative pressure caused by ejection of a first fluid from the nozzle and mixes the first and second fluids together, first and second diaphragms which allows the nozzle to shift in an axial direction with respect to the needle, and a first fluid chamber which is supplied with the first fluid. A valve in which a valve body contacts and separates from a valve seat according to the shifting action of the nozzle is formed by providing either the nozzle or the needle with the valve body and providing the other with the valve seat in the first fluid chamber. A back pressure chamber connecting to the first fluid chamber via the valve is provided between a trunk portion of the nozzle and a basal part of the needle.

14 Claims, 7 Drawing Sheets

EJECTOR AND FUEL CELL SYSTEM USING THE SAME

CROSS REFERENCE TO RELATED ART

The present patent application claims the benefit under 35 U.S.C. 119 of Japanese Patent Application No. 2009-090674 filed on Feb. 13, 2009, the disclosure of which is incorporated into this patent application by reference.

BACKGROUND OF THE INVENTION

1. Field of the Invention

The present invention relates to an ejector for ejecting fluid and a fuel cell system employing the ejector.

2. Description of Related Art

Development of fuel cells such as PEFCs (Polymer Electrolyte Fuel Cells), generating electricity by use of hydrogen (fuel gas, reactant gas) supplied to an anode and air containing oxygen (oxidizer gas, reactant gas) supplied to a cathode, is accelerating in recent years.

A fuel cell system generally has a stacked cell structure, in which some tens to hundreds of fuel cells are stacked in order to increase sufficiently an output voltage. Each cell is formed by sandwiching an MEA (Membrane Electrode Assembly) between a pair of separators. The MEA includes two electrodes (anode, cathode) and a solid polymer electrolyte film sandwiched between the electrodes. With hydrogen gas (as the fuel) supplied to the anode and air containing oxygen (as the oxidizer) supplied to the cathode, the fuel cell generates electricity by electro-chemical reaction occurring on the electrodes.

In a fuel cell system employing such a fuel cell, hydrogen gas is supplied from a hydrogen tank to the fuel cell while anode-off gas is discharged from the fuel cell. Since the amount of hydrogen contained in the hydrogen gas supplied from the hydrogen tank is larger than that necessary for the electricity generation, the anode-off gas discharged from the fuel cell contains unreacted hydrogen. For the effective use of hydrogen, the anode-off gas is circulated by making use of a circulating apparatus, mixed with the hydrogen gas from the hydrogen tank, and supplied (returned) to the fuel cell.

The circulating apparatus is in many cases implemented by an ejector, which circulates the anode-off gas utilizing pressure energy without a need of any external power source.

A fuel cell system employing the ejector generally needs a regulator for changing the pressure of hydrogen supplied to the fuel cell depending on the amount of generated electric power that is required (i.e., the amount of electricity or electric power that should be generated), a device for switching/adjusting the opening diameter of a nozzle of the ejector to achieve suitable circulating performance in response to the amount of the required electric power to be generated.

For the regulator and the device for switching/adjusting the opening diameter (opening area) of the nozzle of the ejector, a variety of techniques have been devised, as disclosed in Japanese Laid-open Patent Publications No. 2002-227799, No. 2002-056868, No. 2004-095528 and No. 2005-183357, for example.

SUMMARY OF THE INVENTION

In the case of conventional ejectors, however, the flow rate of the fluid (e.g., hydrogen) especially in a low flow-rate range is not so accurately controlled as required and there is a need for improvement of the flow rate control in the low flow-rate range.

It is therefore the primary objective of the present invention to provide an ejector contributing to further improvement of the flow rate control in the low flow-rate range and a fuel cell system employing such an ejector.

In accordance with an aspect of the present invention, there is provided an ejector comprising: a body; a nozzle having a trunk portion and a front-end part and ejecting a first fluid supplied thereto; a needle having a basal part and a tip portion and being placed coaxially with the nozzle; a diffuser drawing in a second fluid using negative pressure caused by the ejection of the first fluid from the nozzle, mixing the second fluid with the first fluid ejected from the nozzle, and discharging the mixed fluid; first and second diaphragms being fixed to the body at their peripheral parts, being fixed to the nozzle at positions separate from each other in an axial direction of the nozzle, and allowing the nozzle to shift in the axial direction with respect to the needle; and a first fluid chamber being surrounded at least by the first and second diaphragms, the body, the nozzle, and the needle and being supplied with the first fluid to be supplied to the nozzle. In the ejector, a valve in which a valve body contacts and separates from a valve seat according to the shifting action of the nozzle is formed by providing either the nozzle or the needle with the valve body and providing the other with the valve seat in the first fluid chamber. A back pressure chamber connecting to the first fluid chamber via the valve is provided between the trunk portion of the nozzle and the basal part of the needle.

In the ejector configured as above, the valve in which the valve body contacts and separates from the valve seat according to the shifting action of the nozzle is formed by providing either the nozzle or the needle with the valve body and providing the other with the valve seat in the first fluid chamber. Therefore, the flow rate of the first fluid ejected from the nozzle can be controlled by use of the valve.

Further, since the back pressure chamber connecting to the first fluid chamber via the valve is provided between the trunk portion of the nozzle and the basal part of the needle, at least part of the pressure of the first fluid applied from the first fluid chamber to the nozzle via the valve can be canceled thanks to the back pressure chamber.

In this case, it is possible to modify the ratio between effective area of the nozzle on which pressure of the first fluid acts downstream of the valve (i.e., sealing area of the valve body) and effective area (pressure-receiving area) of the back pressure chamber and thereby change thrust of the nozzle (caused by the difference between the areas), that is, change force acting on the nozzle in its movable direction. With this method, the nozzle can be moved smoothly (or mobility of the nozzle can be kept desirably) in flow rate control in a low flow-rate range (with the valve opening narrowed), by which the flow rate control of the first fluid ejected from the nozzle can be improved. Specifically, it is possible to set the flow rate of the ejected first fluid at a high level by setting the sealing area of the valve body larger than the pressure-receiving area of the back pressure chamber, for example. Conversely, the flow rate of the ejected first fluid can be set at a low level by setting the sealing area of the valve body smaller than the pressure-receiving area of the back pressure chamber.

It is also possible to set the sealing area of the valve body and the pressure-receiving area of the back pressure chamber substantially equal to each other (area difference=0) and thereby cancel out the thrust of the nozzle (i.e., prevent the supplied first fluid from causing force moving the nozzle in the movable direction). The cancellation of the thrust can be achieved more precisely by setting effective areas of the first and second diaphragms substantially equal to each other. In this case, the flow rate of the ejected first fluid can be controlled in proportion to the pressure of a fluid (e.g., air) supplied to a chamber (third fluid chamber) of the ejector, for example. Consequently, an ejector contributing to improvement of the flow rate control of the first fluid can be obtained.

In accordance with another aspect of the present invention, there is provided a fuel cell system employing the ejector described above. In the fuel cell system, the ejector is provided in a fuel circulation circuit used for mixing fuel discharged from a fuel cell with fuel newly supplied from a fuel source and supplying the mixed fuel to the fuel cell.

In the fuel cell system configured as above, when the discharged fuel from the fuel cell is recirculated by mixing it with the newly supplied fuel (fuel to be newly supplied to the fuel cell) using the ejector, the flow rate of the mixed fluid (mixture of the newly supplied fuel and the discharged fuel) supplied to the fuel cell can be controlled by use of a valve. With this configuration, the flow rate control can be performed desirably with high reliability even with a simpler configuration compared to flow rate control employing electric actuators, etc. Consequently, complication of the control of the fuel cell system can be avoided and costs necessary for the control can be reduced.

Other objects, features and advantages of the present invention will become more apparent from the consideration of the following detailed description taken in conjunction with the accompanying drawings.

DETAILED DESCRIPTION OF THE EMBODIMENTS

Figure 1:
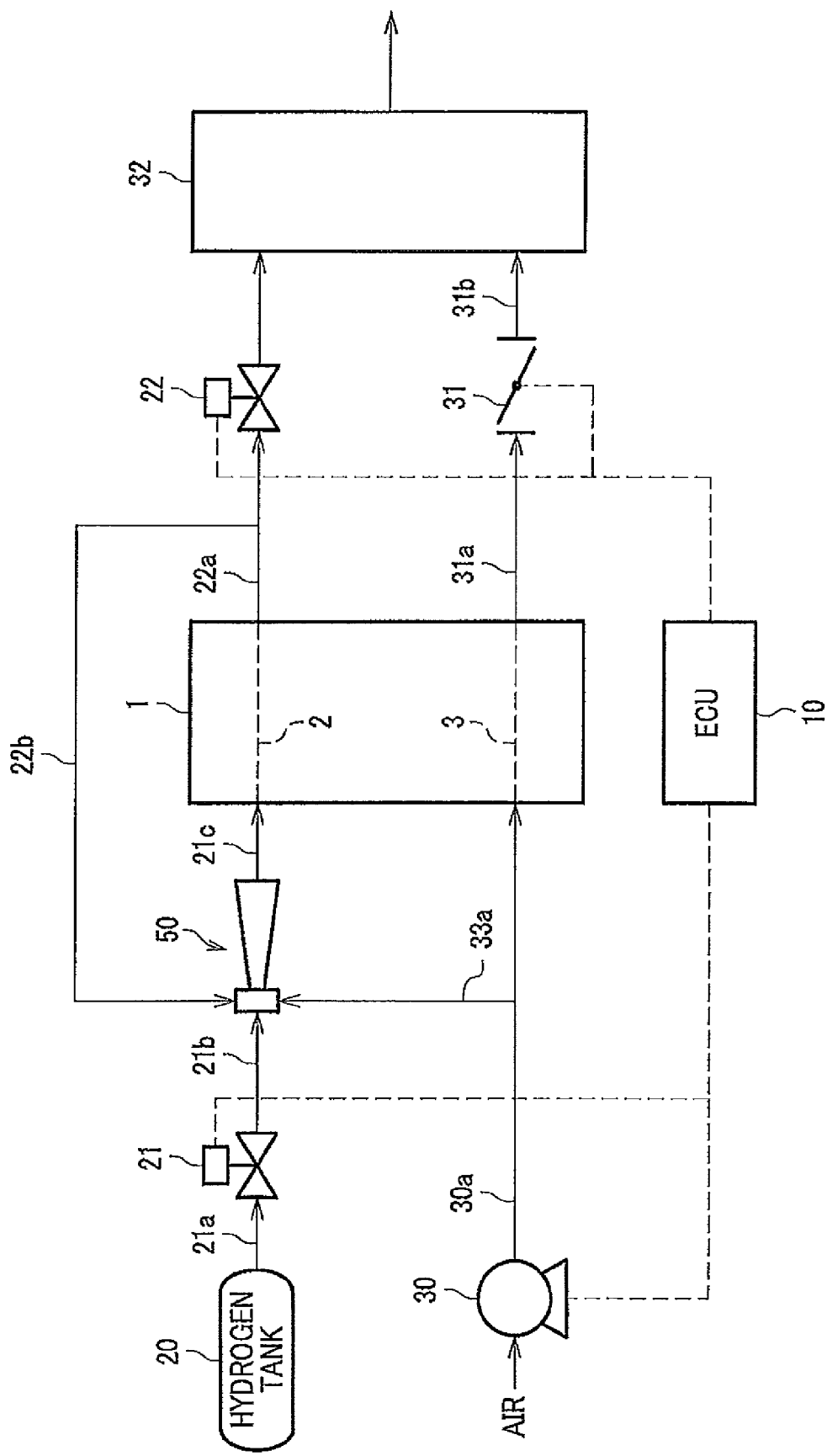
FIG. 1 is a schematic diagram showing the configuration of a fuel cell system employing an ejector in accordance with an embodiment of the present invention.

Referring now to the drawings, a description will be given in detail of a preferred embodiment of an ejector in accordance with the present invention.

An ejector 50 according to this embodiment is installed in a fuel cell system which is mounted on a vehicle (e.g., electric car), for example. As shown in FIG. 1, the fuel cell system includes the ejector 50, a fuel cell stack 1, a hydrogen tank 20 as a fuel supply means (source of hydrogen supply), a compressor 30 as an oxidizer supply means, and an ECU (Electronic Control Unit) 10 for controlling the foregoing components.

The fuel cell stack 1 in this embodiment is a PEFC (Polymer Electrolyte Fuel Cell), which is formed by stacking a plurality of unit cells (single cells) each having an MEA (Membrane Electrode Assembly) sandwiched between separators (unshown). The MEA includes a cathode, an anode and an electrolyte film (solid polymer film) sandwiched between the cathode and anode. Each separator is formed to have anode channels (hereinafter collectively referred to as an "anode channel 2") and cathode channels (hereinafter collectively referred to as a "cathode channel 3") formed thereon or therethrough (grooves, thorough holes, etc.).

In the fuel cell stack 1 having the above stacked cell structure, hydrogen from the hydrogen tank 20 is supplied to the anode of each unit cell via the anode channel 2, while air (containing oxygen) from the compressor 30 is supplied to the cathode of each unit cell via the cathode channel 3, causing electrode reactions on the surfaces of catalysts (e.g., Pt) contained in the electrodes (anode, cathode) and thereby shifting the fuel cell stack 1 to a state in which electricity generation is possible.

When the fuel cell stack 1 in this state (ready for electricity generation) is electrically connected to an external load (e.g., unshown motor for driving wheels of a vehicle) and electric current is drawn from the stack, the fuel cell stack 1 starts generating and outputting electricity.

<Anode System>

An anode system in the fuel cell system includes the hydrogen tank 20, a shut-off valve 21 (normally closed), the ejector 50 (each located upstream of the fuel cell stack 1), and a purge valve 22 (normally closed) located downstream of the fuel cell stack 1.

The hydrogen tank 20 is connected to the inlet of the anode channel 2 via tubing 21*a*, the shut-off valve 21, tubing 21*b*, the ejector 50 and tubing 21*c*. When the ignition of the fuel cell car is turned ON to request activation of the fuel cell stack 1, the shut-off valve 21 is opened by the ECU 10, causing the hydrogen in the hydrogen tank 20 to be supplied to the anode channel 2 via the tubing 21*a*, etc.

The outlet of the anode channel 2 is connected to an inlet of the ejector 50 (connecting to the ejector's second fluid chamber 42 which will be explained later) via the tubing 22*a* and 22*b*. Anode-off gas (containing unreacted hydrogen) discharged from the anode channel (anode) 2 is processed by an unshown gas-liquid separator which separates water (liquid state) included in the anode-off gas from the anode-off gas, and thereafter is returned to the ejector 50 disposed upstream of the fuel cell stack 1.

The anode-off gas returning to the ejector 50 is mixed with hydrogen supplied from the hydrogen tank 20 and then supplied again to the anode channel 2. Thus, a hydrogen circulation line to be used for circulating and reusing hydrogen is formed by the tubing 22*a* and 22*b* in this embodiment.

The purge valve 22 is a normally-closed type electromagnetic valve, which is opened by the ECU 10 if impurities (water vapor, nitrogen, etc.) contained in the anode-off gas (hydrogen) circulating through the tubing 22*a* and 22*b* have to be discharged (purged) during the electricity generation by the fuel cell stack 1. With the purge valve 22 open, hydrogen gas inside the tubing 22*a* flows into in a dilutor 32, and is diluted with air supplied through tubing 31*a* of a cathode system (explained below) into the dilutor 32 and discharged from the car.

<Cathode System>

The cathode system in the fuel cell system includes the compressor 30 and the dilutor 32 (gas processor).

The compressor 30 is connected to the inlet of the cathode channel 3 via tubing 30*a*. The compressor 30 operating according to a revolving speed instruction from the ECU 10 takes in air containing oxygen and supplies the air to the cathode channel 3. Generally, the revolving speed of the compressor 30 is set according to the position of the accelerator pedal being stamped down, which corresponds to the throttle valve opening and increases to supply air which is more compressed and made to flow at a higher flow rate with the throttle valve opening becoming large.

Incidentally, the compressor 30 operates on electricity supplied from the fuel cell stack 1 and/or a high-voltage battery (unshown) which stores and discharges electricity generated by the fuel cell stack 1.

The tubing 30a branches off in its middle portion. The branched part (air branch line 33a) is connected to an inlet of the ejector 50 (connecting to the ejector's third fluid chamber 43 which will be explained later). Thus, the air from the compressor 30 is supplied directly to the ejector's third fluid chamber 43 (as pilot pressure) through the air branch line 33a.

The outlet of the cathode channel 3 is connected to the dilutor 32 via the tubing 31a, a back pressure valve 31 and tubing 31b. Cathode-off gas (humid) discharged from the cathode channel (cathode) 3 is supplied to the dilutor 32 via the tubing 31a, etc. The back pressure valve 31 (e.g., butterfly valve) controls the pressure of the air inside the cathode channel 3.

The dilutor 32 serves to dilute hydrogen in the anode-off gas (taken in through the purge valve 22) with the cathode-off gas or diluting gas (taken in through the tubing 31b) by mixing the anode-off gas with the cathode-off gas.

<Ejector>

Next, the ejector 50 of this embodiment will be explained below referring to FIG. 2. In the following explanation, the leftward direction and rightward direction in FIG. 2 will be referred to as a "first direction" and a "second direction", respectively. Similarly, the left end (or a part close to the left end) and right end (or a part close to the right end) of a component (needle 70, nozzle 80, etc.) in FIG. 2 will be referred to as a "first end" and a "second end", respectively.

The ejector 50 includes a body 60, the needle 70 fixed inside the body 60, a nozzle 80 substantially in a cylindrical shape housing the needle 70, and a diffuser 90 provided around an ejecting hole 82a of the nozzle 80. The needle 70 and the nozzle 80 are housed in the body 60. The needle 70, the nozzle 80 and the diffuser 90 are arranged coaxially.

In the ejector 50 of this embodiment, the needle 70 is fixed with respect to the body 60, while the nozzle 80 is capable of shifting in the axial direction (first direction and second direction) relative to the fixed needle 70 as will be explained later.

First and second diaphragms 100 and 110 (made of elastic material such as synthetic rubber and flexing according to the shifting action of the nozzle 80) are fixed to the base-end portion 81 and the front-end part 82 of the nozzle 80, respectively, and are also attached to the body 60 to link the nozzle 80 to the body 60. By the first and second diaphragms 100 and 110, the space inside the body 60 is partitioned into three fluid chambers (first fluid chamber 41, second fluid chamber 42, third fluid chamber 43).

The needle 70 has a supporting portion 71 in an annular shape and a needle body 72 supported by the supporting portion 71 and extending in the second direction (along the length of the body 60). The supporting portion 71 is fixed to an inner convex part 61 of the body 60 using bolts 62 (only one bolt 62 is shown in FIG. 2). A base portion 73 (explained later) of the needle body 72 has been inserted into a hole 71a formed at the center of the supporting portion 71 and fixed to the supporting portion 71.

Incidentally, the supporting portion 71 has a plurality of through holes (unshown) in its axial direction. The through holes allow hydrogen (as "first fluid" which will be explained later) to flow through the supporting portion 71 in the axial direction.

In the following, parts constituting the ejector 50 will be explained in more detail.

The body 60 is formed substantially in a cylindrical shape to house the needle 70 and the nozzle 80. The diffuser 90 is provided at the second end of the body 60. The outlet 91 of the diffuser 90 is connected to the anode channel 2 of the fuel cell stack 1 via the tubing 21c shown in FIG. 1.

Inside the body 60, first and second springs 63 and 64 are held so as to bias the nozzle 80 in opposite directions and thereby maintain the nozzle 80 relative to the needle 70. In this embodiment, each of the springs 63, 64 is selected to have a reasonable spring constant by considering the pressure of hydrogen (as the first fluid supplied to the ejector 50) so that the nozzle 80 fully opens (i.e., biased and shifted in the second direction as shown in FIG. 2) in its initial state (initial position).

The needle body 72 has the base portion 73 in a cylindrical shape and a tip portion 74 (extending in the second direction from the base portion 73) to be inserted into the ejecting hole 82a of the nozzle 80. The base portion 73 has a large-diameter portion 75 and a small-diameter portion 76. A channel 73a which allows for passage of hydrogen (as the first fluid explained later) is formed using the space inside the large-diameter portion 75 and small-diameter portion 76. The large-diameter portion 75 is formed to have a flange portion 73b at its second end. The flange portion 73b is provided with a valve seat 77a (annular sealing member (elastic member)) as a part of a valve 77 which will be explained later.

To the first end of the large-diameter portion 75 of the needle body 72, a base-end portion 81 (as a "trunk portion") of the nozzle 80 (explained later) is attached via a sealing member 75a.

Four openings 76a as inlets of the channel 73a are formed at the first end of the small-diameter portion 76, while four slot-like communicating holes 76b as outlets of the channel 73a are formed at the second end of the small-diameter portion 76. Thus, a middle portion of the channel 73a connects to the first fluid chamber 41 (explained later) via the openings 76a, while the second end of the channel 73a connects to a space inside the nozzle 80 and outside the needle 70 via the slot-like communicating holes 76b. The communicating holes 76b may also be formed like long and narrow grooves, oblong holes, etc.

Figure 2:
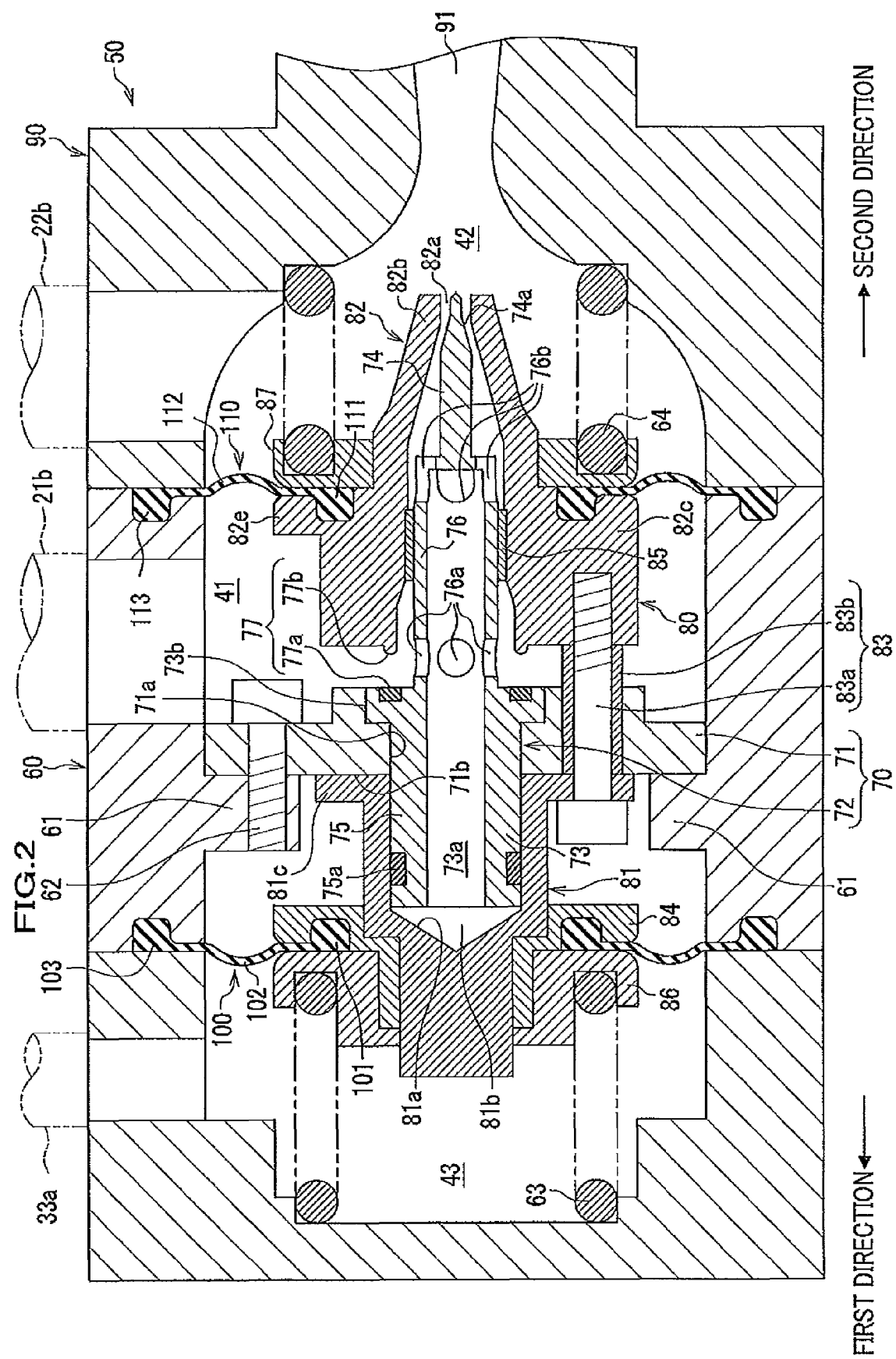
FIG. 2 is a cross-sectional view showing the configuration of the ejector.

The peripheral surface of the small-diameter portion 76 is in contact with the inner surface of a bearing 85 attached on the inner surface of a front-end part 82 (explained later) of the nozzle 80 as shown in FIG. 2, allowing the front-end part 82 to slide in the axial direction relative to the small-diameter portion 76 (needle body 72).

The tip portion 74 of the needle 70, designed to be inserted into the ejecting hole 82a of the nozzle 80, has a tapered end 74a.

The nozzle 80 is made up of the base-end portion 81 situated close to the base portion 73 (first end) of the needle 70, the front-end part 82 situated close to the tip portion 74 (second end) of the needle 70, and a connecting member 83 which connects the base-end portion 81 and front-end part 82 together.

The base-end portion 81 (having a hat-like cross-sectional shape) has a concavity at its center, in which the first end of the base portion 73 of the needle body 72 is housed to be slidable in the axial direction. In this embodiment, the bottom 81a of the concavity is formed to have a cross-sectional shape like an inverted triangle, and a back pressure chamber 81b is formed between the bottom 81a and an end face of the base portion 73 of the needle body 72 facing the bottom 81a. The back pressure chamber 81b connects to the first end of the channel 73a inside the needle body 72. Thus, the back pressure chamber 81b connects further to the first fluid chamber 41 via the channel 73a, the openings 76a and the valve 77 (explained later). Consequently, the first fluid in the first fluid chamber 41 flows into the back pressure chamber 81b via the valve 77, the openings 76a and the channel 73a, by which force in the movable direction of the nozzle 80 (force moving the nozzle 80 in the second direction) is canceled.

The second end of the base-end portion 81 is formed to have a flange portion 81c. The flange portion 81c restricts the shifting (displacement) of the nozzle 80 in the second direction when it makes contact with an end face 71b (first end) of the supporting portion 71 of the needle 70. In this embodiment, the shapes of the nozzle 80 and needle 70 are designed so that the area of the opening at the ejecting hole 82a of the nozzle 80 (i.e., annular gap between the front-end part 82 of the nozzle 80 and the tip portion 74 of the needle 70) reaches its maximum when the flange portion 81c contacts the end face 71b. The flange portion 81c is formed to have through holes, into which bolts 83a (forming the connecting member 83) are inserted.

To the base-end portion 81 of the nozzle 80, the first diaphragm 100 as an annular member is fixed to surround the base-end portion 81. The first diaphragm 100 is made up of an inner circumferential portion 101 to be fixed to the base-end portion 81, a thin skirt portion 102 extending radially from the inner circumferential portion 101, and an outer circumferential portion 103 formed around the skirt portion 102 to be fixed to the body 60.

The inner circumferential portion 101 is sandwiched between an annular holding member 84 secured to the base-end portion 81 and an annular retaining member 86 covering the holding member 84 and fixed to the base-end portion 81. The skirt portion 102 is so flexible as to be capable of flexing according to the shifting action of the nozzle 80. The outer circumferential portion 103 is sandwiched between a couple of blocks of the body 60 and fixed to the body 60.

With the first diaphragm 100 attached as described above, hermeticity of the third fluid chamber 43 (partitioned by the first diaphragm 100) is maintained excellently.

Between the retaining member 86 and a side wall of the third fluid chamber 43, the aforementioned first spring 63 is held in a compressed state.

The front-end part 82 of the nozzle 80 has a cylindrical ejecting part 82b extending along the length of the body 60. The aforementioned ejecting hole 82a is formed at the end of the ejecting part 82b. The ejecting part 82b is formed in a tapered shape, with its diameter gradually decreasing toward the ejecting hole 82a.

The front-end part 82, which is disposed to almost perfectly cover the needle's tip portion 74 and the small-diameter portion 76 of the needle's base portion 73, is capable of sliding in the axial direction relative to the needle 70. A valve body 77b, which is an annular protruding portion and a part of the valve 77, is formed on an end face (first end) of a base-end portion 82c of the front-end part 82.

The valve body 77b, facing the annular valve seat 77a provided on the large-diameter portion 75 (flange portion 73b) of the base portion 73 of the needle 70, is capable of making contact with the valve seat 77a when the nozzle 80 shifts in the first direction (see FIG. 5) as will be explained later.

In this embodiment, the effective area (pressure-receiving area) of the back pressure chamber 81b and the effective area (sealing area) of the valve body 77b are set equal to each other.

Each of the aforementioned bolts 83a (forming the connecting member 83) is screwed into the base-end portion 82c of the front-end part 82 through a collar 83b. The collar 83b functions as a spacer for keeping a predetermined distance between the base-end portion 81 and the front-end part 82 in the nozzle 80.

To the front-end part 82 of the nozzle 80, the second diaphragm 110 as an annular member is fixed to surround the front-end part 82. The second diaphragm 110 is made up of an inner circumferential portion 111 to be fixed to the front-end part 82, a thin skirt portion 112 extending radially from the inner circumferential portion 111, and an outer circumferential portion 113 formed around the skirt portion 112 to be fixed to the body 60.

The inner circumferential portion 111 is sandwiched between a flange 82e (a part of the front-end part 82) and an annular retaining member 87 covering the flange 82e and fixed to the front-end part 82. The skirt portion 112 is so flexible as to be capable of flexing according to the shifting action of the nozzle 80. The outer circumferential portion 113 is sandwiched between the body 60 and the diffuser 90 and fixed to the body 60.

With the second diaphragm 110 attached as described above, hermeticity of the second fluid chamber 42 (partitioned by the second diaphragm 110) is maintained excellently. Further, hermeticity of the first fluid chamber 41 (partitioned by the first diaphragm 100 and the second diaphragm 110) is also maintained excellently by the first and second diaphragms 100 and 110.

Between the retaining member 87 and an opposing wall of the second fluid chamber 42, the aforementioned second spring 64 is held in a compressed state.

Incidentally, two identical diaphragms are used as the first and second diaphragms 100 and 110 in this embodiment.

To the first fluid chamber 41 (which is formed by being surrounded at least by the first and second diaphragms 100 and 110 and the body 60), hydrogen is supplied via the tubing 21b.

To the second fluid chamber 42 (which is formed by being surrounded at least by the second diaphragm 110 and the body 60 (diffuser 90)), the anode-off gas (containing unreacted hydrogen) discharged from the anode channel (anode) 2 is supplied via the tubing 22b.

To the third fluid chamber 43 (which is formed by being surrounded at least by the first diaphragm 100 and the body 60), air from the compressor 30 is supplied via the air branch line 33a.

The ejector 50 configured as above ejects the hydrogen (supplied to the first fluid chamber 41) from the ejecting hole 82a of the nozzle 80 via the first fluid chamber 41 and the channel 73a formed inside the needle body 72.

In the ejector 50, the anode-off gas being supplied to the second fluid chamber 42 via the tubing 22b is drawn in by negative pressure caused by the hydrogen ejection from the nozzle's ejecting hole 82a and then mixed with the ejected hydrogen in the diffuser 90. The mixed fluid (mixture of hydrogen and anode-off gas) flows out from the diffuser 90 (ejector 50) and is supplied to the anode channel 2 of the fuel cell stack 1 via the tubing 21c.

Meanwhile, the third fluid chamber 43 of the ejector 50 receives the air supplied from the compressor 30 as mentioned above. According to the pressure of the air supplied to the third fluid chamber 43, the nozzle 80 shifts in the second direction, by which the amount (flow rate) of hydrogen ejected from the ejecting hole 82a is adjusted.

Figure 3:
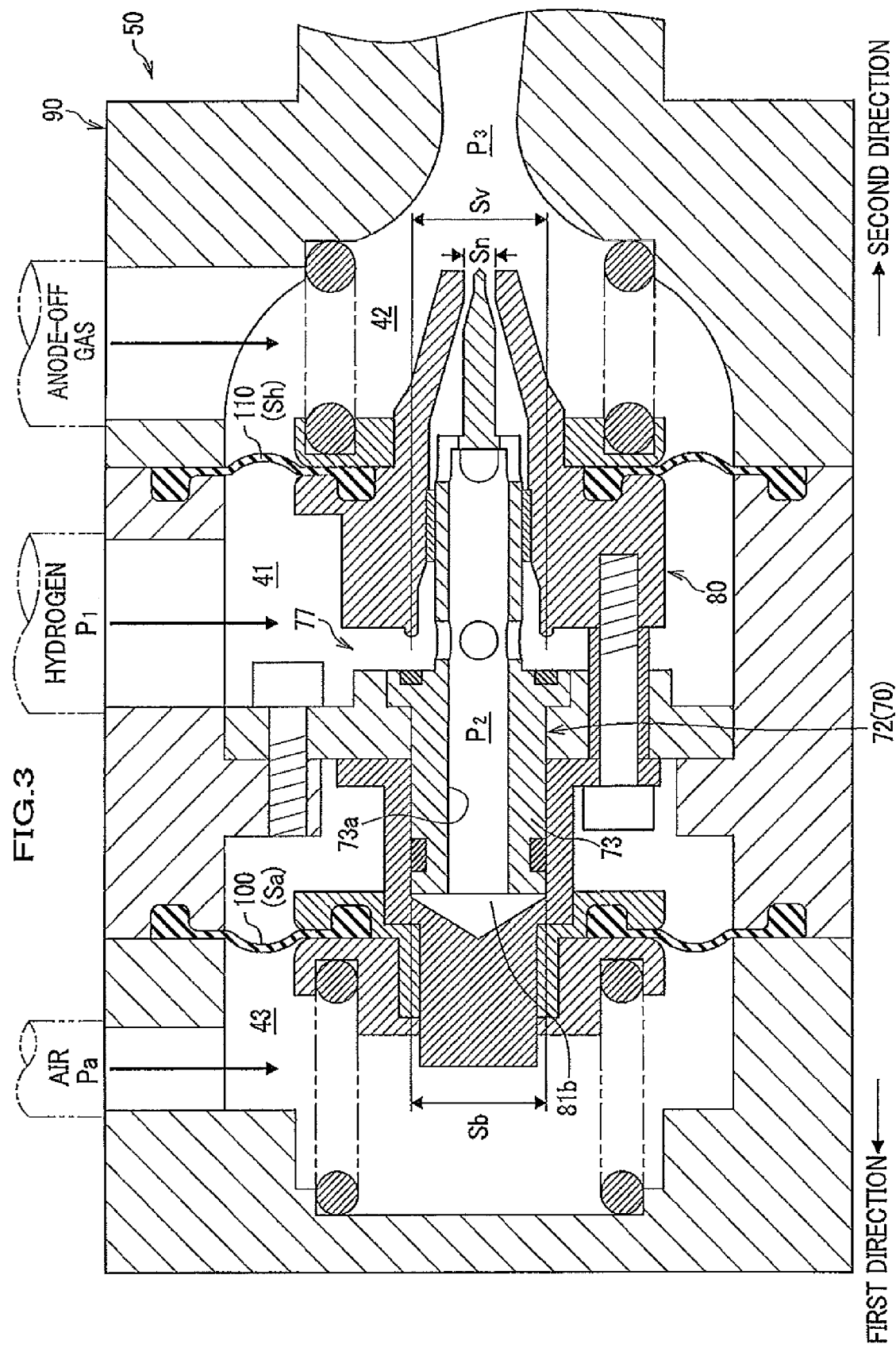
FIG. 3 is a cross-sectional view for explaining relationship among several pressures acting in the ejector.

Here, relationship among several pressures acting in the ejector 50 will be explained referring to FIG. 3. In the following explanation, force acting in the movable direction of the nozzle 80 (i.e., the second direction) will be expressed with the sign "+" and that acting in the second direction will be expressed with the sign "−" unless otherwise specified. Incidentally, effective areas of the first and second diaphragms 100 and 110 are assumed to be equal (Sa=Sh) for the sake of simplicity.

First, force F1 acting on the nozzle 80 in the axial direction due to pressure in the first fluid chamber 41 (upstream of the valve 77) can be expressed by the following equation (1):

$$F1=P_1(Sh-Sv-(Sa-Sb)) \quad (1)$$

where "$P_1$" denotes the pressure of hydrogen supplied to the first fluid chamber 41, "Sa" denotes the effective area of the first diaphragm 100, "Sh" denotes the effective area of the second diaphragm 110, "Sv" denotes the sealing area of the valve body 77b of the valve 77, and "Sb" denotes the effective area (pressure-receiving area) of the back pressure chamber 81b.

Second, force F2 acting on the nozzle 80 in the axial direction due to pressure inside the nozzle 80 (downstream of the valve 77) can be expressed by the following equation (2):

$$F2=P_2(Sv-Sn-Sb) \quad (2)$$

where "$P_2$" denotes pressure acting on the nozzle 80 from inside the nozzle 80 (downstream of the valve 77) and "Sn" denotes the opening area of the ejecting hole 82a of the nozzle 80.

Third, force F3 (in the first direction) acting on the nozzle 80 in the axial direction due to pressure in the second fluid chamber 42 can be expressed by the following equation (3):

$$F3=P_3(Sh-Sn) \quad (3)$$

where "$P_3$" denotes pressure (ejection pressure) acting on the second fluid chamber 42.

Fourth, force F4 acting on the nozzle 80 in the axial direction due to pressure in the third fluid chamber 43 can be expressed by the following equation (4):

$$F4=Pa \cdot Sa \quad (4)$$

where "Pa" denotes the pressure of the air supplied to the third fluid chamber 43.

From the above equations (1)-(4), the following relationships (5) and (6) hold in regard to the forces F1, F2, F3 and F4 acting on the nozzle 80 in the ejector 50:

$$F1+F2-F3+F4=0 \quad (5)$$

namely, $$P_1(Sh-Sv-Sa+Sb)+P_2(Sv-Sn-Sb)-P_3(Sh-Sn)+Pa \cdot Sa=0 \quad (6)$$

When the flow rate of the fluid is controlled within a low flow-rate range by the opening/closing operation of the valve 77, $P_2=P_3$ is satisfied, that is, no differential pressure occurs between the spaces before and after the ejecting hole 82a of the nozzle 80 (i.e., between the space inside the nozzle 80 and the second fluid chamber 42).

Further, another relationship Sb=Sv holds in this embodiment since the ejector 50 is equipped with the back pressure chamber 81b and the pressure-receiving area Sb of the back pressure chamber 81b and the sealing area Sv of the valve body 77b are set equal to each other as mentioned above.

Considering the above conditions ($P_2=P_3$, Sb=Sv, Sa=Sh), the ejection pressure $P_3$ acting on the second fluid chamber 42 is obtained from the equation (6) as follows:

$$P_3=Pa \quad (7)$$

This means that the ejection pressure $P_3$ corresponds to the pressure Pa of the air supplied to the third fluid chamber 43.

Therefore, a suitable ejection pressure $P_3$ (corresponding to the air pressure Pa) can be achieved by controlling the pressure Pa of the air supplied to the third fluid chamber 43.

If we assume that the ejector 50 of this embodiment is not equipped with the back pressure chamber 81b, that is, supposing that the effective area (pressure-receiving area) Sb of the back pressure chamber 81b is 0, the aforementioned equation (6) translates into the following equation (8):

$$P_1(Sh-Sv-Sa)+P_2(Sv-Sn)-P_3(Sh-Sn)+Pa \cdot Sa=0 \quad (8)$$

With the aforementioned conditions ($P_2=P_3$, Sb=Sv, Sa=Sh), the equation (8) translates into the following equation (9):

$$-P_1 \cdot Sv+P_3(Sv-Sh)+Pa \cdot Sh=0 \quad (9)$$

From the equation (9), the ejection pressure $P_3$ is obtained as follows:

$$P_3 = \frac{P_a S_h - P_1 S_v}{S_h - S_v} = \frac{P_a - P_1 \gamma}{1 - \gamma} \quad (10)$$

$$\gamma = \frac{S_v}{S_h}$$

In this case, the ejection pressure $P_3$ is expressed as a function of γ (the sealing area Sv of the valve 77 divided by the effective area Sh of the second diaphragm 110) and the aforementioned relationship (7) can not be obtained.

In contrast, in the ejector 50 of this embodiment, the ejection pressure $P_3$ corresponds to the pressure Pa of the air supplied to the third fluid chamber 43 as indicated by the equation (7), and thus a suitable ejection pressure $P_3$ (corresponding to the air pressure Pa) can be achieved directly by controlling the pressure Pa of the air supplied to the third fluid chamber 43.

On the other hand, when the flow rate of the fluid is controlled mainly in a high flow-rate range by adjusting the opening area of the ejecting hole 82a by shifting the nozzle 80 in the axial direction, $P_1=P_2$ is satisfied, that is, no differential pressure occurs between the spaces before and after the valve 77 (i.e., between the first fluid chamber 41 and the space inside the nozzle 80).

Considering this relationship $P_1=P_2$ and the aforementioned condition Sa=Sh, the equation (6) translates into the following equation (11):

$$-P_1 \cdot Sn-P_3(Sh-Sn)+Pa \cdot Sh=0 \quad (11)$$

From the equation (11), the ejection pressure $P_3$ acting on the second fluid chamber 42 is obtained as follows:

$$P_3 = \frac{P_a S_h - P_1 S_n}{S_h - S_n} = \frac{P_a - P_1 \beta}{1 - \beta} \quad (12)$$

$$\beta = \frac{S_n}{S_h}$$

Thus, in the flow rate control in the high flow-rate range, the ejection pressure $P_3$ is obtained as a function of the quotient β (the opening area Sn of the nozzle 80 divided by the effective area Sh of the second diaphragm 110).

Next, the operation of the ejector 50 in the fuel cell system will be described.

In the fuel cell system equipped with the ejector 50 configured as above, the nozzle 80 of the ejector 50 in the initial state (in which the fuel cell system is not operating) stays at a second-end position (rightmost position in FIG. 2) as shown in FIG. 2 due to biasing force in the second direction achieved by appropriate settings of the first and second springs 63 and 64.

When the ignition (unshown) is turned ON to request activation of the fuel cell stack 1, the shut-off valve 21 (see FIG. 1) is opened by the ECU 10, by which hydrogen in the hydrogen tank 20 is supplied to the first fluid chamber 41 of the ejector 50 via the tubing 21a, etc. (see FIG. 4). The hydrogen supplied to the first fluid chamber 41 flows into the nozzle 80 and thereafter into the second fluid chamber 42 through the channel 73a inside the needle 70 and the ejecting hole 82a of the nozzle 80.

When the pressure of the supplied hydrogen reaches a prescribed level (at which pressure corresponding to the differential pressure between the first and second springs 63 and 64 is applied to the second fluid chamber 42 due to the supplied (ejected) hydrogen), the biasing force of the second spring 64 (with the assistance of the increasing pressure in the second fluid chamber 42) becomes comparable to that of the first spring 63 and the nozzle 80 starts shifting in the first direction.

Figure 5:
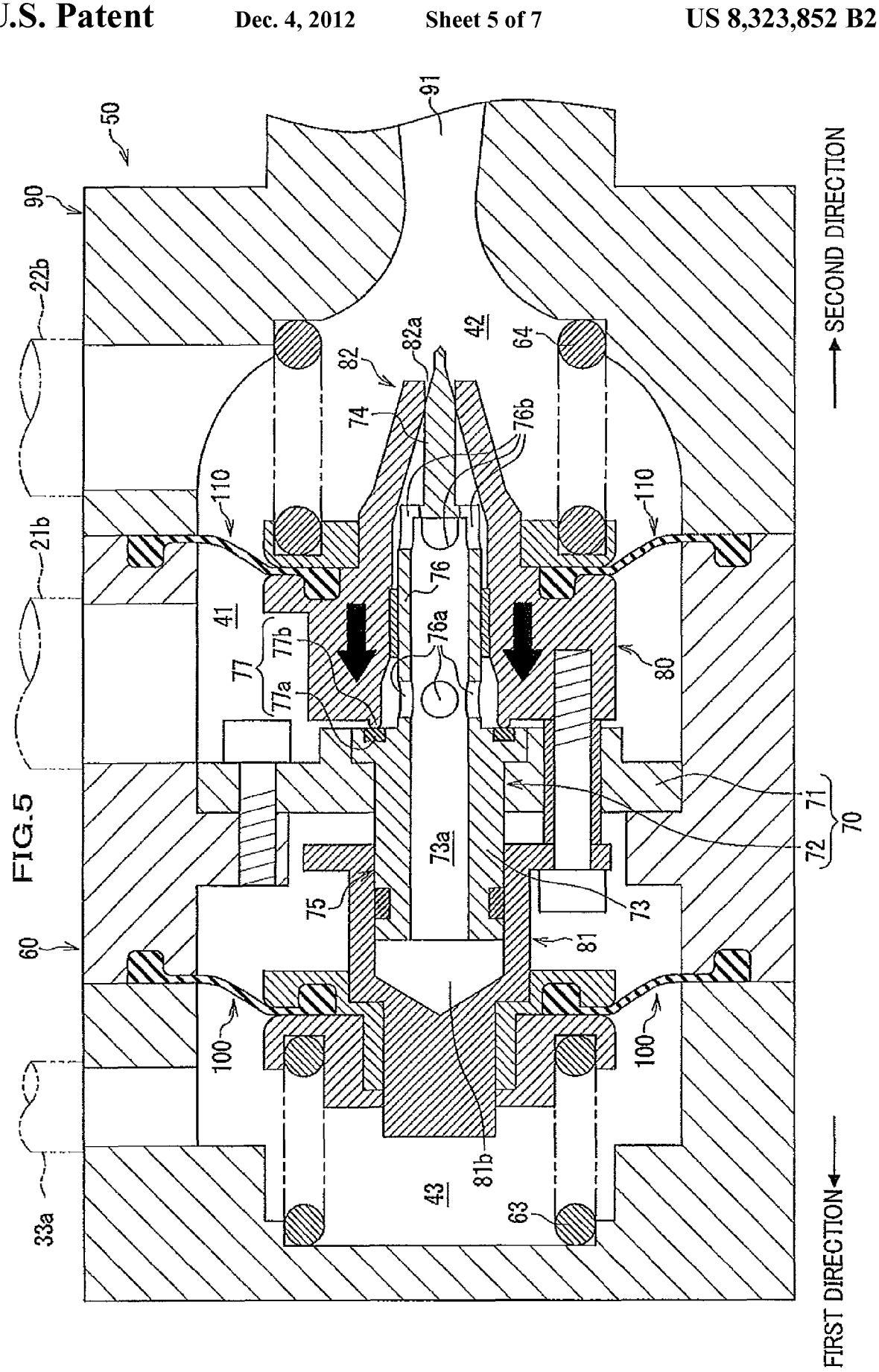
FIG. 5 is a cross-sectional view showing a state of the ejector in which a nozzle has shifted rightward to close a valve.

When the increasing hydrogen pressure reaches another prescribed level, the valve body 77b of the nozzle 80 shifting in the first direction makes contact with the valve seat 77a of the needle 70, by which the valve 77 is closed temporarily (see FIG. 5).

Thereafter, when air is supplied from the compressor 30 (operating at a prescribed revolving speed under the control of the ECU 10) to the third fluid chamber 43 via the air branch line 33a, air pressure inside the third fluid chamber 43 increases and force biasing and shifting the nozzle 80 in the second direction starts acting. At the same time, hydrogen is consumed in the anode channel 2 of the fuel cell stack 1 and hydrogen pressure in the second fluid chamber 42 (connecting to the anode channel 2 via the tubing 21c) starts dropping, by which differential pressure is caused between the spaces before and after (upstream and downstream of) the valve 77. When the nozzle 80 starts shifting in the second direction and the valve 77 starts opening due to the aforementioned supply of air to the third fluid chamber 43, the hydrogen in the first fluid chamber 41 starts flowing into the channel 73a inside the needle 70 via the valve 77. Thereafter, the hydrogen reaching the ejecting part 82b of the nozzle 80 is ejected to the second fluid chamber 42 through the ejecting hole 82a.

Figure 4:
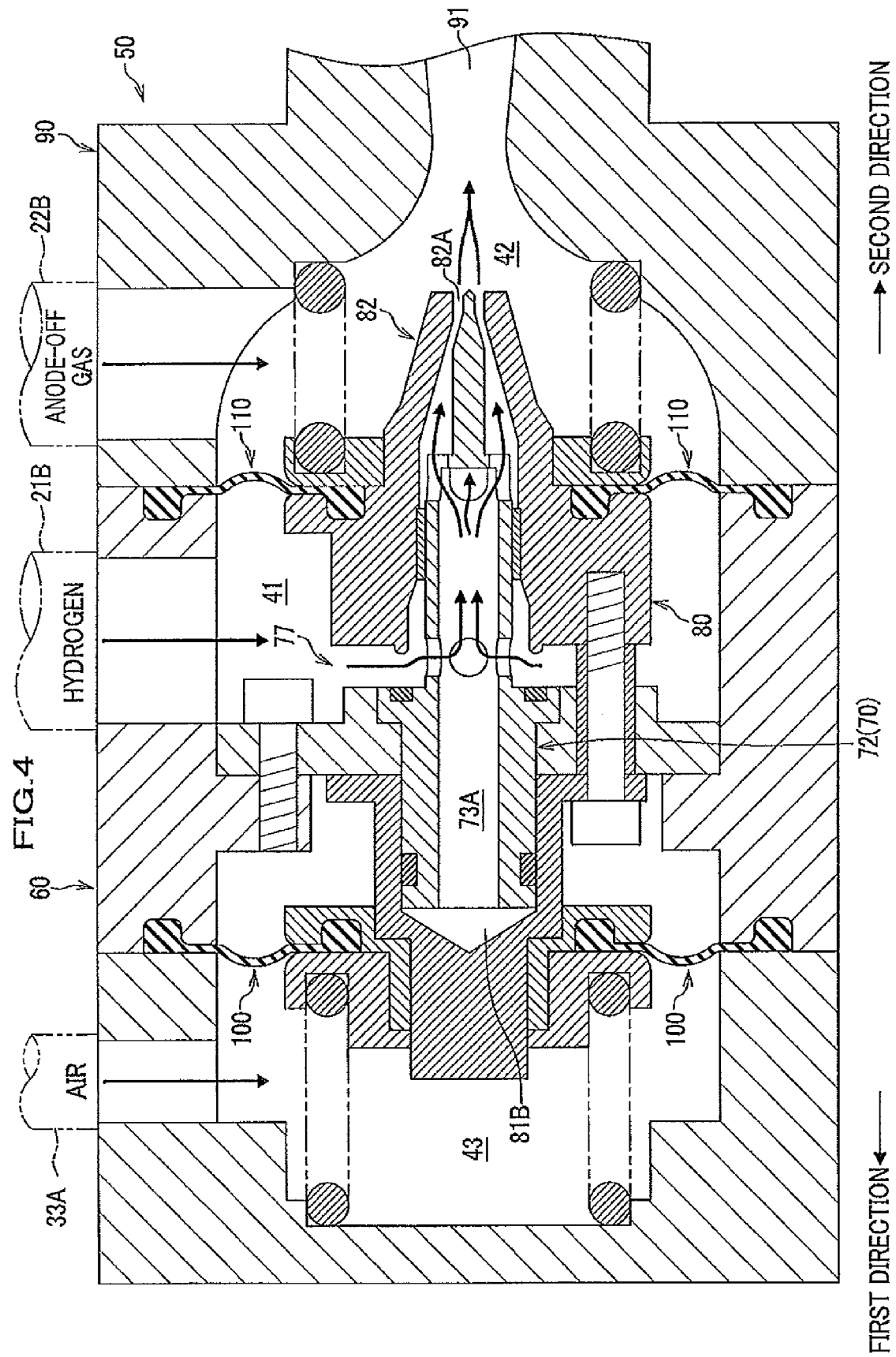
FIG. 4 is a cross-sectional view for explaining the flow of fluids (air, hydrogen, anode-off gas) in the ejector.

As the air pressure in the third fluid chamber 43 is increased, the nozzle 80 shifts further in the second direction, the valve 77 opens further, and hydrogen is ejected from the ejecting hole 82a in an amount (flow rate) corresponding to the pressure of the air supplied to the third fluid chamber 43 (see FIG. 4).

In the case where the flow rate of the fluid is controlled within the low flow-rate range by the opening/closing operation of the valve 77, $P_2=P_3$ is satisfied (no differential pressure occurs between the spaces before and after the ejecting hole 82a of the nozzle 80 (i.e., between the space inside the nozzle 80 and the second fluid chamber 42)). Further, the relationship Sb=Sv holds since the ejector 50 is equipped with the back pressure chamber 81b and the pressure-receiving area Sb of the back pressure chamber 81b is equal to the sealing area Sv of the valve body 77b as mentioned above. Consequently, the aforementioned equation (7) holds, that is, the ejection pressure $P_3$ acting on the second fluid chamber 42 corresponds to the pressure Pa of the air supplied to the third fluid chamber 43. Therefore, a suitable ejection pressure $P_3$ (corresponding to the air pressure Pa) can be achieved by controlling the pressure Pa of the air supplied to the third fluid chamber 43.

On the other hand, in the case where the flow rate of the fluid is controlled mainly in the high flow-rate range by adjusting the opening area of the ejecting hole 82a by shifting the nozzle 80 in the axial direction, $P_1=P_2$ is satisfied (no differential pressure occurs between the spaces before and after the valve 77 (i.e., between the first fluid chamber 41 and the space inside the nozzle 80)). In this case, the ejection pressure $P_3$ is obtained as a function of the quotient β (the opening area Sn of the nozzle 80 divided by the effective area Sh of the second diaphragm 110) as indicated by the equation (12).

Since the anode-off gas is fed back to the second fluid chamber 42 via the tubing 22b as explained above, the anode-off gas supplied (returning) to the second fluid chamber 42 is drawn in by negative pressure caused by the hydrogen ejection from the ejecting hole 82a and then mixed with the ejected hydrogen in the diffuser 90. The mixed fluid (mixture of hydrogen and anode-off gas) is supplied to the anode channel 2 of the fuel cell stack 1.

As described above, in the ejector 50 of this embodiment, the valve 77 in which the valve body 77b contacts and separates from the valve seat 77a according to the shifting action of the nozzle 80 is formed by providing either the nozzle 80 or the needle 70 with the valve body 77b and providing the other with the valve seat 77a in the first fluid chamber 41. Therefore, the flow rate of the hydrogen ejected from the nozzle 80 can be controlled by use of the valve 77.

Further, since the back pressure chamber 81b connecting to the first fluid chamber 41 via the valve 77 is provided between the base-end portion 81 of the nozzle 80 and the base portion 73 of the needle 70, pressure of hydrogen applied from the first fluid chamber 41 to the nozzle 80 via the valve 77 can be canceled thanks to the back pressure chamber 81b.

In this case, thrust of the nozzle 80 can be canceled out and the supplied hydrogen can be prevented from causing force moving the nozzle 80 since the sealing area of the valve body 77b and the pressure-receiving area of the back pressure chamber 81b are set equal to each other in this embodiment. Consequently, the flow rate of the hydrogen ejected from the ejecting hole 82a can be controlled in proportion to the pressure of the air supplied to the third fluid chamber 43. Thus, an ejector 50 contributing to improvement of the hydrogen flow rate control can be obtained.

It is also possible to modify the ratio between the effective area of the nozzle 80 on which pressure of hydrogen acts downstream of the valve 77 (i.e., the sealing area of the valve body 77b) and the effective area (pressure-receiving area) of the back pressure chamber 81b and thereby change the thrust of the nozzle 80 (caused by the difference between the areas), that is, change force acting on the nozzle 80 in the movable direction. With this method, the nozzle 80 can be moved smoothly (or mobility of the nozzle 80 can be kept desirably) in flow rate control in a low flow-rate range (with the opening of the valve 77 narrowed), by which the flow rate control of the hydrogen ejected from the nozzle 80 can be improved. Specifically, it is possible to set the flow rate of the ejected hydrogen at a high level by setting the sealing area of the valve body 77b larger than the pressure-receiving area of the back pressure chamber 81b, for example. Conversely, the hydrogen ejection flow rate can be set at a low level by setting the sealing area of the valve body 77b smaller than the pressure-receiving area of the back pressure chamber 81b.

In the fuel cell system employing the ejector 50 of this embodiment, when the anode-off gas discharged from the fuel cell stack 1 is recirculated by mixing it with the newly supplied hydrogen (to be newly supplied to the fuel cell stack 1) using the ejector 50, the flow rate of the mixed fluid (mixture of hydrogen and anode-off gas) supplied to the fuel cell stack 1 can be controlled by use of the valve 77. With this configuration, the flow rate control can be performed desirably with high reliability even with a simpler configuration compared to flow rate control employing electric actuators, etc. Consequently, complication of the control of the fuel cell system can be avoided and costs necessary for the control can be reduced, while also achieving the aforementioned effects of the ejector 50 in the fuel cell system.

As described above, by the embodiment in accordance with the present invention, an ejector contributing to further improvement of the flow rate control in the low flow-rate range and a fuel cell system employing such an ejector can be obtained.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the valve body 77b and the valve seat 77a as components of the valve 77 are provided on the nozzle 80 and the needle 70, respectively, in the above embodiment, it is also possible to provide the valve body 77b on the large-diameter portion 75 of the base portion 73 of the needle 70 while providing the valve seat 77a on the base-end portion 82c of the front-end part 82 of the nozzle 80.

The shape of the valve body 77b is not restricted to an annular shape (circular ring shape); the valve body 77b may be formed in various shapes (elliptic ring shape, oblong circle-like ring shape, polygonal ring shape, etc.).

Figure 6:
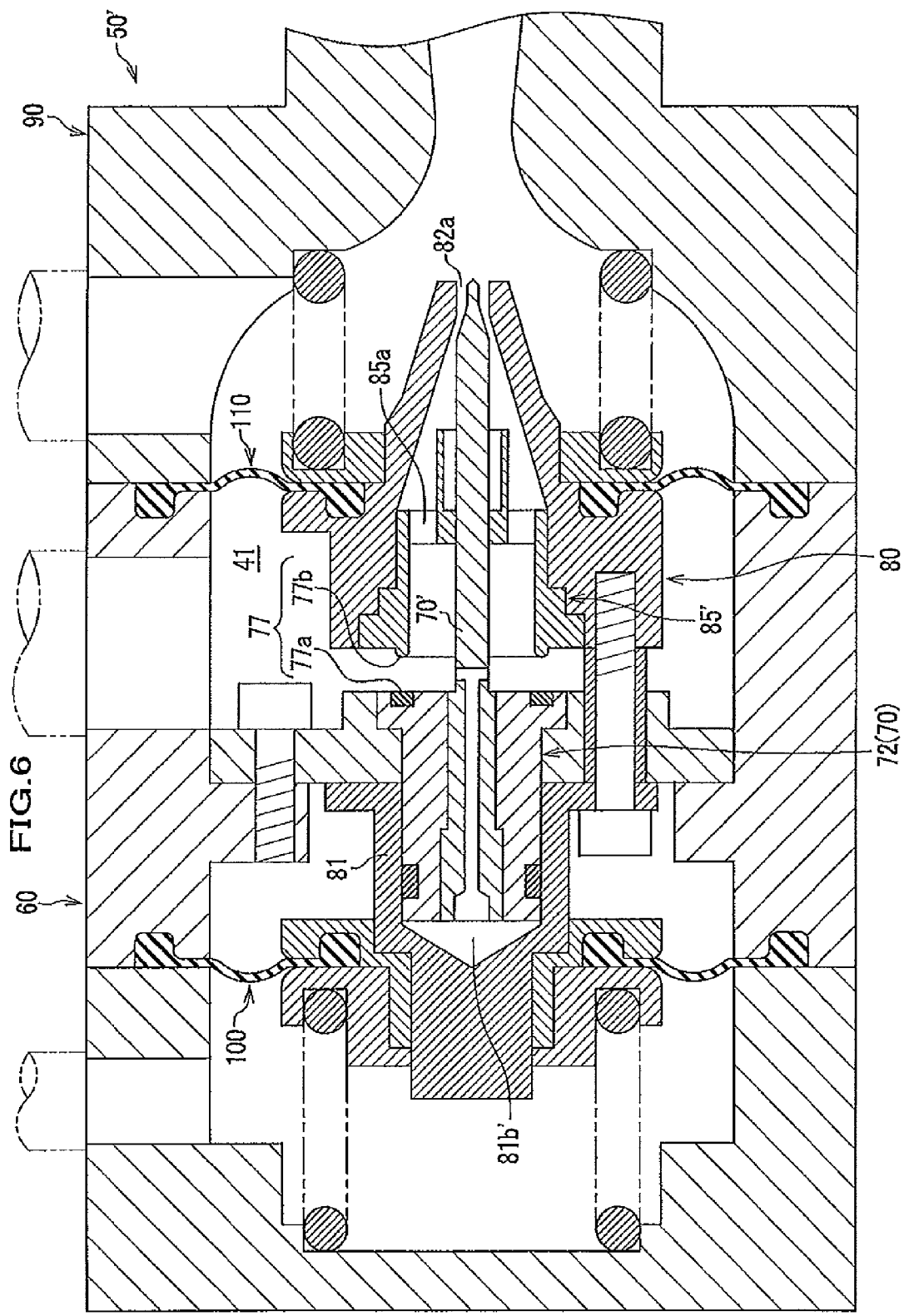
FIG. 6 is a cross-sectional view showing the configuration of an ejector as a modification of the embodiment.

An ejector 50' as another modification of the ejector 50 is shown in FIG. 6, in which a needle 70' having more solid structure is employed and the needle 70' is supported by a shaft bearing member 85' having a hydrogen channel 85a. Also with this configuration, pressure of hydrogen applied from the first fluid chamber 41 to the nozzle 80 via the valve 77 can be canceled thanks to a back pressure chamber 81b' formed between the needle 70' and the base-end portion 81 of the nozzle 80, and an ejector 50' contributing to further improvement of the flow rate control in the low flow-rate range can be obtained.

Figure 7:
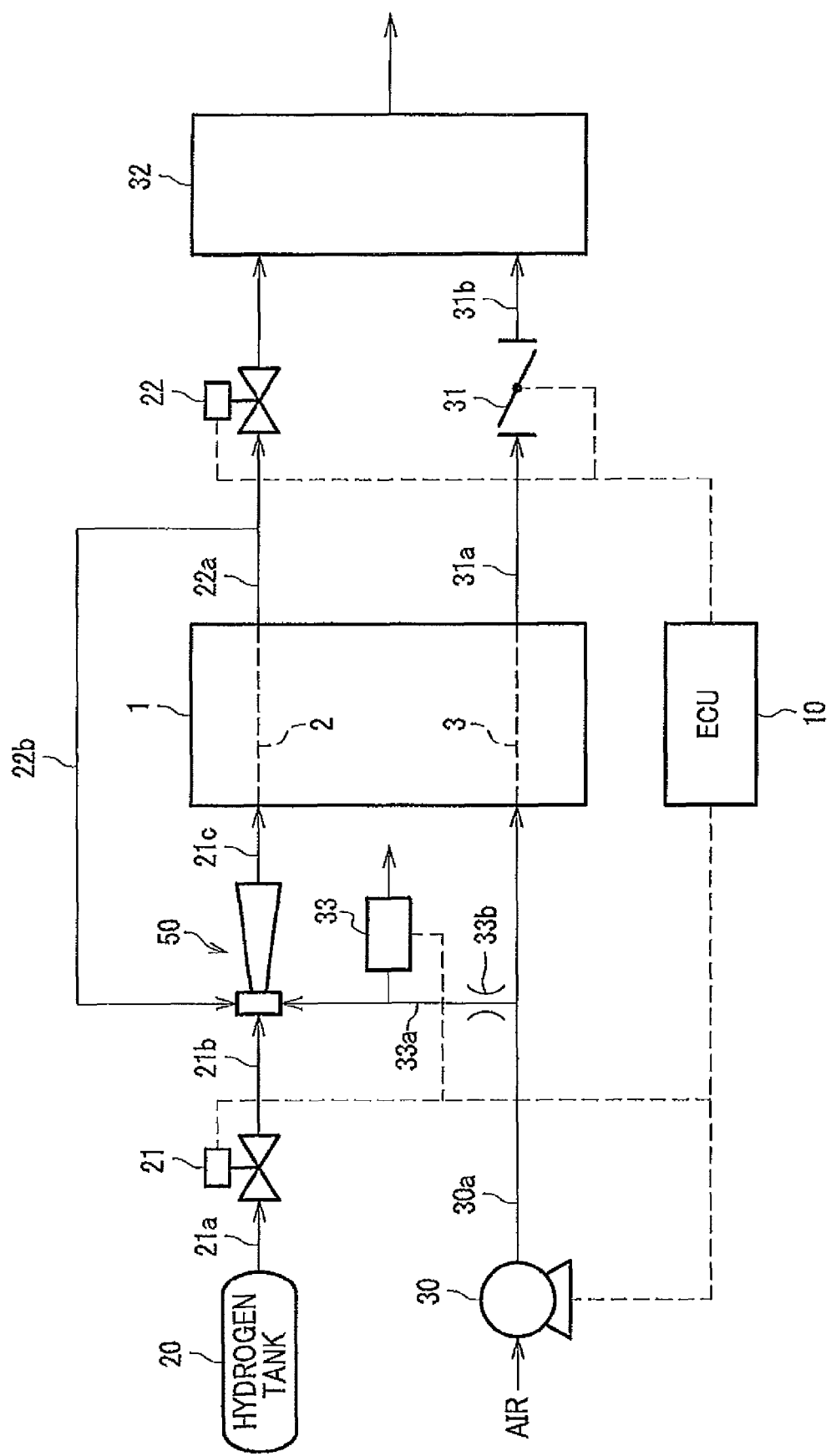
FIG. 7 is a schematic diagram showing a modification of the fuel cell system in accordance with the present invention.

A modification of the fuel cell system employing the ejector 50 is shown in FIG. 7, in which the air branch line 33a connecting to the third fluid chamber 43 of the ejector 50 is provided with an orifice 33b, and an injector 33 for adjusting the air pressure inside the air branch line 33a is connected to the orifice 33b. The pressure of the air supplied to the third fluid chamber 43 is adjusted by use of the injector 33 under the control of the ECU 10. In this system, the injector 33 has the function of discharging air inside the air branch line 33a and thereby adjusting the air pressure inside the air branch line 33a.

What is claimed is:

1. An ejector for ejecting fluid, comprising:
a body;
a nozzle having a trunk portion and a front-end part and ejecting a first fluid supplied thereto;
a needle having a base part and a tip portion and being placed coaxially with the nozzle;
a diffuser drawing in a second fluid using negative pressure caused by ejection of the first fluid from the nozzle, mixing the second fluid with the first fluid ejected from the nozzle, and discharging the mixed fluid;
first and second diaphragms each having an outer portion being fixed to the body at their peripheral part and an inner portion, the first and second diaphragms being fixed to the nozzle at positions separate from each other in an axial direction of the nozzle, and allowing the nozzle to shift in the axial direction with respect to the needle; and
a first fluid chamber being surrounded at least by the first and second diaphragms, the body, the nozzle and the needle and being supplied with the first fluid to be supplied to the nozzle, wherein:
a valve in which a valve body contacts and separates from a valve seat according to the shifting action of the nozzle is formed by providing either the nozzle or the needle with the valve body and providing the other with the valve seat in the first fluid chamber, and
a back pressure chamber connecting to the first fluid chamber via the valve is provided between the trunk portion of the nozzle and the base part of the needle.

2. The ejector according to claim 1, wherein sealing area of the valve body is substantially equal to effective area of the back pressure chamber.

3. The ejector according to claim 2, wherein effective areas of the first and second diaphragms are substantially equal to each other.

4. The ejector according to claim 1, wherein the first and second diaphragms are formed of a flexible material and are configured to move in response to movement of the nozzle in the axial direction.

5. The ejector according to claim 1, wherein at least one of the first and second diaphragms is coupled to a front-end part of the nozzle.

6. The ejector according to claim 1, wherein the needle has a channel extending at least partly therethrough and is disposed in fluid communication with the back pressure chamber.

7. The ejector according to claim 6, wherein the channel is in fluid communication with the first fluid through one or more openings.

8. The ejector according to claim 1, wherein the first and second diaphragms are configured and positioned to partition an interior of the body into the first fluid chamber and into a second and third fluid chamber, wherein the fluid chambers are aligned in the axial direction.

9. The ejector according to claim 1, wherein the base part of the needle has a flange portion and wherein the flange portion forms a portion of the valve.

10. The ejector according to claim 9, wherein the flange portion forms the valve seat.

11. The ejector according to claim 1, wherein the back pressure chamber is defined by only the nozzle and the needle.

12. A fuel cell system, comprising an ejector according to claim 1, wherein the ejector is provided in a fuel circulation circuit for mixing fuel discharged from a fuel cell with fuel newly supplied from a fuel source and supplying the mixed fuel to the fuel cell.

13. The fuel cell system according to claim 12, wherein a sealing area of the valve body is substantially equal to an effective area of the back pressure chamber.

14. The fuel cell system according to claim 13, wherein effective areas of the first and second diaphragms are substantially equal to each other.

* * * * *